United States Patent [19]
Yoshida et al.

[11] Patent Number: 5,968,450
[45] Date of Patent: *Oct. 19, 1999

[54] SCANDIUM CONTAINING HYDROGEN ABSORPTION ALLOY AND HYDROGEN ABSORPTION ELECTRODE

[75] Inventors: Masato Yoshida, Tsukuba; Takitaro Yamaguchi, Saitama-ken; Takao Ogura, Kounosu, all of Japan

[73] Assignee: Hitachi Chemical Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/306,225

[22] Filed: Sep. 14, 1994

[30] Foreign Application Priority Data

Sep. 14, 1993 [JP] Japan ..................... 5-228810
Mar. 31, 1994 [JP] Japan ..................... 6-061873

[51] Int. Cl.$^6$ ................... H01M 4/38
[52] U.S. Cl. ............ 420/900; 420/434; 420/435; 420/439; 420/441; 420/451; 420/580; 420/588; 148/424; 148/425; 148/426; 148/427; 148/442; 429/59; 429/218; 429/223; 429/224
[58] Field of Search .................. 420/416, 900, 420/439, 441, 443, 451, 455, 434, 435, 580, 588; 429/59, 218, 223, 224; 148/400, 421, 424, 425, 426, 442, 427

[56] References Cited

U.S. PATENT DOCUMENTS 4,215,008   7/1980   Hagiwara et al. ............ 252/184

FOREIGN PATENT DOCUMENTS

| A-0506084 | 9/1992 | European Pat. Off. . |
| A-2623213 | 12/1976 | Germany . |
| 56-31341 | 4/1979 | Japan . |
| 5-14017 | 11/1985 | Japan . |
| 61-64069 | 4/1986 | Japan . |
| 61-101957 | 5/1986 | Japan . |

OTHER PUBLICATIONS

Database WPI Week 9140, Derwent Publications Ltd., London, GB; AN 91–290421 & JP-A-3 191 040 (Sanyo Electric KK) Aug. 21, 1991, *abstract* *Table 1(c), example A37*.
Database WPI Week 9233, Derwent Publications Ltd., London, GB; AN 92–274083 & JP-A-4 187 733 (Sanyo Electric Co) Jul. 6, 1992 *abstract* *Table 1, example 24*.
Database WPI Week 9233, Derwent Publications Ltd., London, GB; AN 92–274084 & JP-A-4 187 734 (Sanyo Electric Co) Jul. 6, 1992 *abstract* *Table 1, example 24*.
Database WPI Week 9233, Derwent Publications Ltd., London, GB; AN 92–274085 & JP-A-4 187 735 (Sanyo Electric Co) Jul. 6, 1992 *abstract* *Table 1, example 24*.
Database WPI Week 8810, Derwent Publications Ltd., London, GB; AN 88–068502 & JP-A-63 024 042 (Sanyo Tokushu Seiko) Feb. 1, 1988 *abstract* *Table 1, example 3*.

*Primary Examiner*—Sikyin IP
*Attorney, Agent, or Firm*—Pennie & Edmonds LLP

[57] ABSTRACT

The present invention provides a scandium containing hydrogen absorption alloy having an alloy phase which is represented by the following formula;

$$(Sc_xA_{1-x})(B'_yB''_{2-y})_z$$

wherein A is at least one of Ti, Zr, rare-earth elements, a mixture of Ti and at least one of Zr, Ta, Nb, Hf, Ca and rare-earth elements, and a mixture of Zr and at least one of Ti, Ta, Nb, Hf, Ca and rare-earth elements; B' is at least one of Ni, Fe, Co and a mixture of at least one of Ni, Fe and Co and at least one of Al, Ga, Si and In; B'' is at least one of Mn, V, Cr, Nb, Ti and a mixture of at least one of Mn, V, Cr, Nb and Ti and at least one of Al, Ga, Si and In; x represents $0<x\leq1$; y represents $0<y<2$; and z represents $0.75\leq z\leq1.2$, and the alloy phase includes at least one of a part which belongs to a C15 type Laves phase and a part which belongs to a C14 type Laves phase, and a hydrogen absorption electrode which includes the alloy.

4 Claims, 4 Drawing Sheets

① $Zr_{1.0} Ni_{1.3} Mn_{0.7}$ (ABSORPTION) } PRIOR ART
② $Zr_{1.0} Ni_{1.3} Mn_{0.7}$ (DESORPTION)
③ $Sc_{1.0} Ni_{1.3} Mn_{0.7}$ (ABSORPTION) } THE PRESENT INVENTION
④ $Sc_{1.0} Ni_{1.3} Mn_{0.7}$ (DESORPTION)

SCANDIUM CONTAINING HYDROGEN ABSORPTION ALLOY AND HYDROGEN ABSORPTION ELECTRODE

BACKGROUND OF THE INVENTION a) Field of the Invention

This invention relates to a hydrogen absorption alloy for use in hydrogen storage and transportation and an electrode material for a nickel-hydrogen storage battery, and a hydrogen absorption electrode for use as a negative pole of a nickel-hydrogen storage battery.

b) Description of the Related Art

The following four types have been proposed as hydrogen absorption alloys: the $AB_5$ type, represented by $LaNi_5$ and $MmNi_5$ (Mm is a misch metal); the $AB_2$ type, represented by $ZrMn_2$ and $ZrV_2$; the AB type, represented by TiFe and TiCo; and the $A_2B$ type, represented by $Mg_2Ni$. They are used in the manufacture of secondary batteries, heat pumps, actuators and fuel tanks for hydrogen automobiles as well as in hydrogen storage and transportation, which use depends on the properties of the alloy, such as the hydrogen absorption temperature and plateau pressure.

In the field of electronic machinery, weight reduction has been in great demand. A battery, which is a part of the machinery, is no exception, and there is also a need for small-sized storage batteries having a higher energy density. As an example, at present, nickel-hydrogen storage batteries, which have a higher energy density than that of a nickel-cadmium batteries, are much sought after in the market place. $AB_5$ type materials, such as $LaNi_5$ and $MmNi_5$, which can absorb and desorb hydrogen electrochemically, or $AB_2$ type hydrogen absorption alloys having a Laves phase structure, such as $ZrMn_2$, can be used as the negative pole material of this nickel hydrogen storage battery. At present, $MmNi_5$ type hydrogen absorption alloys, for which early activation is easy, is put into practical use as a negative pole material for nickel-hydrogen storage batteries. However, in order to obtain higher capacity, further efforts have been made to place a storage-battery utilizing an $AB_2$ type alloy, in particular, a hydrogen absorption alloy having a Laves phase comprising $ZrMn_2$ and so on into practical use.

Conventional $AB_2$ type alloys comprising $ZrMn_2$ and so on, however, have a problem in that the discharge capacity at high rate discharging will decrease as a result of deterioration due to oxygen in the air. In order to prevent the hydrogen absorption alloy from experiencing atmosphere-induced deterioration, coating- the surface of pulverized alloys with corrosion-resistant nickel or copper has been suggested (Japanese Patent Publications SHO 61-64069, SHO 61-25 101957).

Further, conventional hydrogen absorption alloys have a low hydrogen content when absorbing hydrogen.

For example, the hydrogen content is as low as 1.3 wt. % in Mm—Ni containing $AB_5$ type alloys and 1.5 wt. %. in Zr—Mn containing $AB_2$ type alloys.

Furthermore, in manufacturing electrodes, the step of coating metal foil on alloy powder makes the process complicated.

SUMMARY OF THE INVENTION

It is the first object of the present invention to provide a novel hydrogen absorption alloy, which increases the hydrogen content per weight of the hydrogen absorption alloy by including the light metal Sc instead of heavy metals, such as Mm, Zr.

It is the second object of the present invention to provide a hydrogen absorption alloy, which has a high capacity and is capable of activating the alloy without any special operation.

The first invention of the present application is:

a scandium containing hydrogen absorption alloy having an alloy phase which is represented by the following formula:

$$(Sc_xA_{1-x})(B'_yB''_{2-y})_z$$

wherein:

A represents at least one selected from a group consisting of Ti, Zr, rare-earth elements, a mixture of Ti and at least one metal selected from a group consisting of Zr, Ta, Nb, Hf, Ca and rare-earth elements, and a mixture of Zr and at least one metal selected from a group consisting of Ti, Ta, Nb, Hf, Ca and rare-earth elements;

B' represents at least one selected from a group consisting of Ni, Fe, Co and a mixture of at least one metal selected from a group consisting of Ni, Fe and Co and at least one metal selected from a group consisting of Al, Ga, Si and In;

B" represents at least one selected from a group consisting of Mn, V, Cr, Nb and a mixture of at least one metal selected from a group consisting of Mn, V, Cr and Nb and at least one metal selected from a group consisting of Al, Ga, Si and In;

x represents $0 < x \leq 1$;

y represents $0 < y < 2$; and z represents $0.75 \leq z \leq 1.2$, and said alloy phase includes at least one of a part which belongs to a C15 type Laves phase and a part which belongs to a C14 type Laves phase.

The second invention of the present application is:

a hydrogen absorption electrode which comprises a scandium containing hydrogen absorption alloy which is represented by the following formula:

$$(Sc_xA_{1-x})(C'_yC''_{2-y})_z$$

wherein:

A represents at least one selected from a group consisting of Ti, Zr, rare-earth elements, a mixture of Ti and at least one metal selected from a group consisting of Zr, Ta, Nb, Hf, Ca and rare-earth elements, and a mixture of Zr and at least one metal selected from a group consisting of Ti, Ta, Nb, Hf, Ca and rare-earth elements;

C' represents at least one selected from a group consisting of Ni and a mixture of Ni and at least one metal selected from a group consisting of Fe, Co, Al, Ga, Si and In;

C" represents at least one selected from a group consisting of Mn and a mixture of Mn and at least one metal selected from a group consisting of V, Cr, Nb, Al, Ga, Si and In;

x represents $0 < x \leq 1$;

y represents $0 < y < 2$; and z represents $0.75 \leq z \leq 1.2$, and said alloy phase includes at least one of a part which belongs to a C15 type Laves phase and a part which belongs to a C14 type Laves phase.

It is preferable if each of the metals Sc, A, B' and B" are used as ingots. Sc, A, B' and B" are mixed at a predetermined ratio so as to be alloyed in an arc furnace or a high-frequency heating furnace at a high temperature in an inert gas atmosphere. It is preferable to use $N_2$ gas at a temperature of 1000 to 2000° C., as an atmosphere for alloying, with this being selected according to the elements constituting the alloy.

It is preferable for x to be in a range of $0.2 \leq x \leq 1$. The higher content of Sc, which puts x into this range, makes it easy for the alloy to be electrochemically activated when the alloy is used as an electrode.

The rare-earth elements of A include Y and Mm (misch metal).

A negative pole for a nickel-hydrogen battery can be made utilizing the hydrogen absorption alloy of the present invention. The electrode can be activated more easily than a conventional electrode even though being deteriorated by oxygen in the air. Thus, the number of activating operations can be lessened. Here, the activating operation means, for example, a operation at a high temperature and under a high pressure.

When an $AB_2$ type alloy containing a light-weight Sc metal of the present invention is used as a negative pole material for a nickel hydrogen storage battery and a charge/discharge cycle is effected in an alkaline aqueous solution, a hydrogen absorption electrode having a higher capacity than that of a conventional alloy comprising $ZrMn_2$, etc., and activation of an alloy without any special operation is possible.

DESCRIPTION OF PREFERRED EMBODIMENT

EXAMPLE 1

Metal Sc (shape:ingot, 99.9%, product of Furuuchi Kagaku Co.), metal Mn (shape:flake, 99.9%, product of Furuuchi Kagaku Co.), metal Ni (shape:shot, 99.9%, product of Furuuchi Kagaku Co.) are mixed at a mole-ratio of Sc:Ni:Mn=1.0:1.3:0.7 so as to be alloyed in an arc furnace (1200° C.). A part of the obtained alloy was used for X-ray powder diffraction measurements and the remaining part was used for pressure-composition isotherm measurements (P-C-T measurement). It was acknowledged that the obtained alloy mainly has a cubic system C15 type Laves phase having a lattice constant of 7.025 (1) Å.

Furthermore, at a temperature of 313 K, P-C-T measurements were conducted by a constant volume apparatus so as to examine the hydrogen absorption properties.

Figure 1:
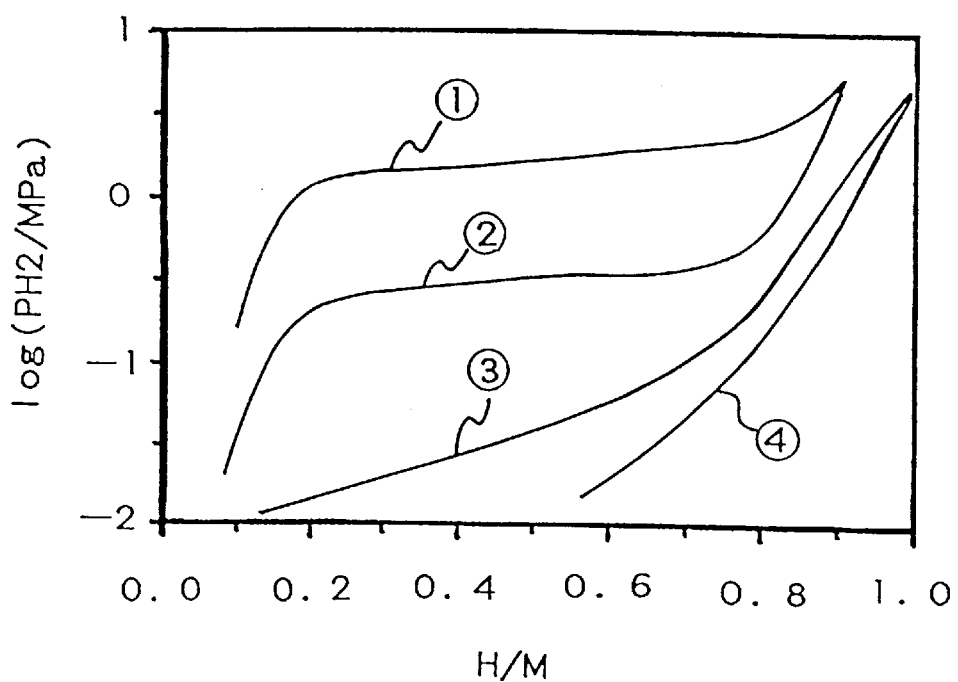
FIG. 1 shows pressure-composition isotherm measurement under 313 K of Sc1.0:Ni1.3:Mn0.7 (the present invention) and Zr1.0:Ni1.3:Mn0.7 (prior art).

FIG. 1 shows the pressure-composition isotherm measurement at 313 K. The ordinate axis shows the logarithm of hydrogen equilibrium pressure and the abscissa axis shows hydrogen content in H/M (number of moles of hydrogen/number of moles of an alloy). For comparison, a result of a Zr containing alloy containing Zr instead of Sc at a mole-ratio of Zr:Ni:Mn=1.0:1.3:0.7 is also shown in FIG. 1.

According to the result, it was confirmed that the Sc containing alloy of the present invention can be easily hydrogenated/dehydrogenated at 313 K (40° C.). It was also confirmed that the hydrogen content absorbed in the alloy is 1.0 in H/M and 1.85 in wt. %, which is higher than that of the Zr containing alloy (0.88 in H/M, 1.3 wt. %).

EXAMPLES 2–16

Metals on the market, such as Sc, Ti, Zr, Y, Ni, Co, Mn, Cr and V, are mixed so as to make an alloy composition as shown in Table 1 and heated to be dissolved in an arc dissolution furnace. A part of the obtained alloy was used for X-ray powder diffraction measurements and the remaining part was used for pressure-composition isotherm measurements (P-C-T measurement) and estimation of the battery properties. In order to verify the alloy phase, precise X-ray powder diffraction measurements were conducted for every sample and the results were used for an analysis using the Rietveld method. Table 1 shows the alloy composition, the result of P-C-T measurements (hydrogen absorption content under 4 MPa), the identification of the alloy phase and the lattice constant (C15 type Laves phase). As a result of using the Rietveld method for the analysis, it was confirmed that a little BCC structure is present besides the Laves phases. Comparing the lattice constant obtained in the analysis and the hydrogen absorption content, the tendency that the higher the lattice constant is, the higher the hydrogen content becomes, was confirmed.

Figure 2:
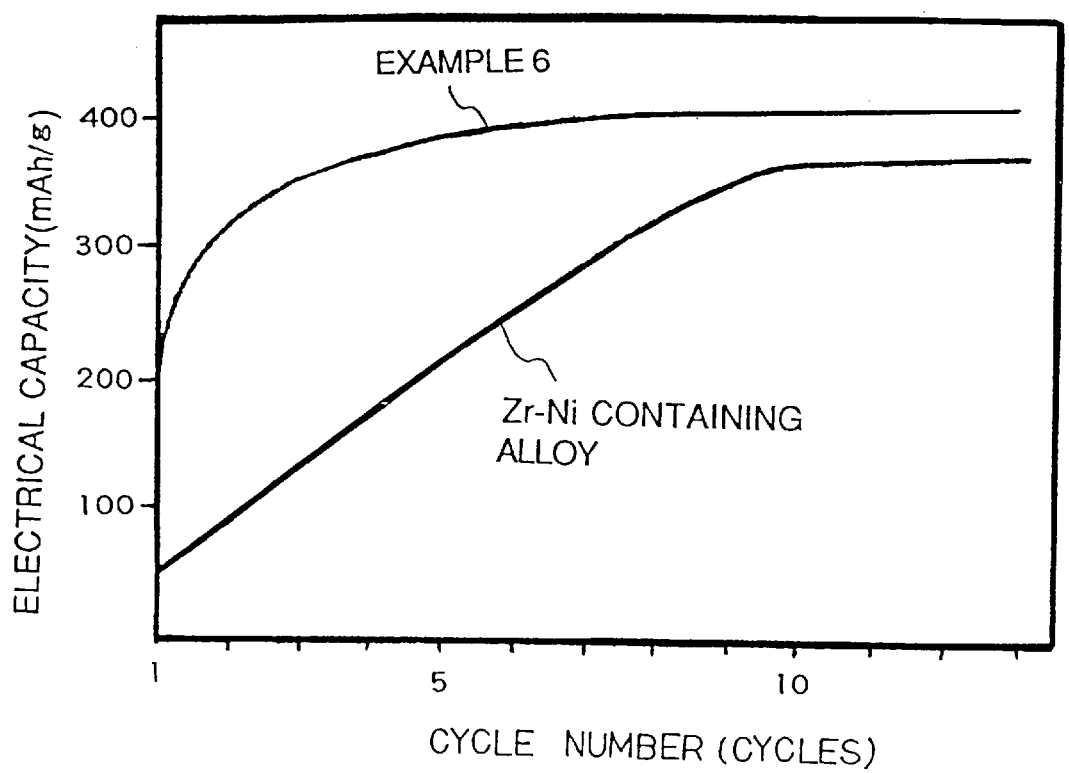
FIG. 2 is a graph comparing the results of the charging/discharging cycle properties of the alloy of Example 6 and a prior art Zr—Ni containing alloy.
Figure 3:
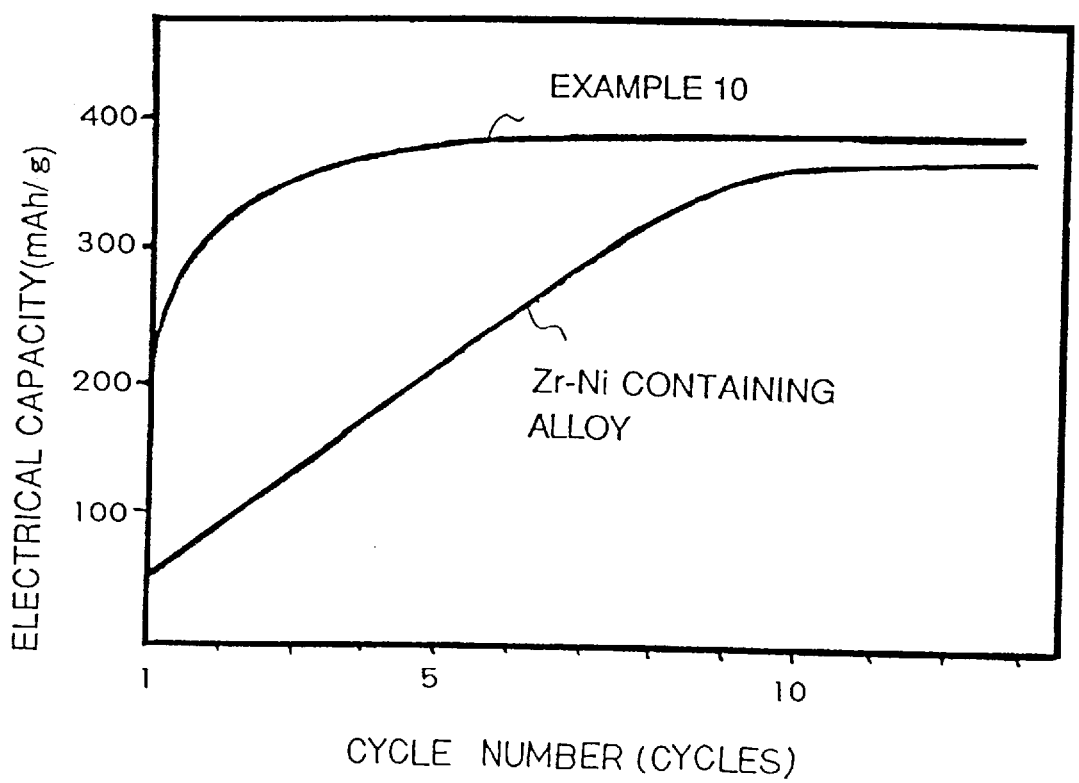
FIG. 3 is a graph comparing the results of the charging/discharging cycle properties of the alloy of Example 10 and a prior art Zr—Ni containing alloy.
Figure 4:
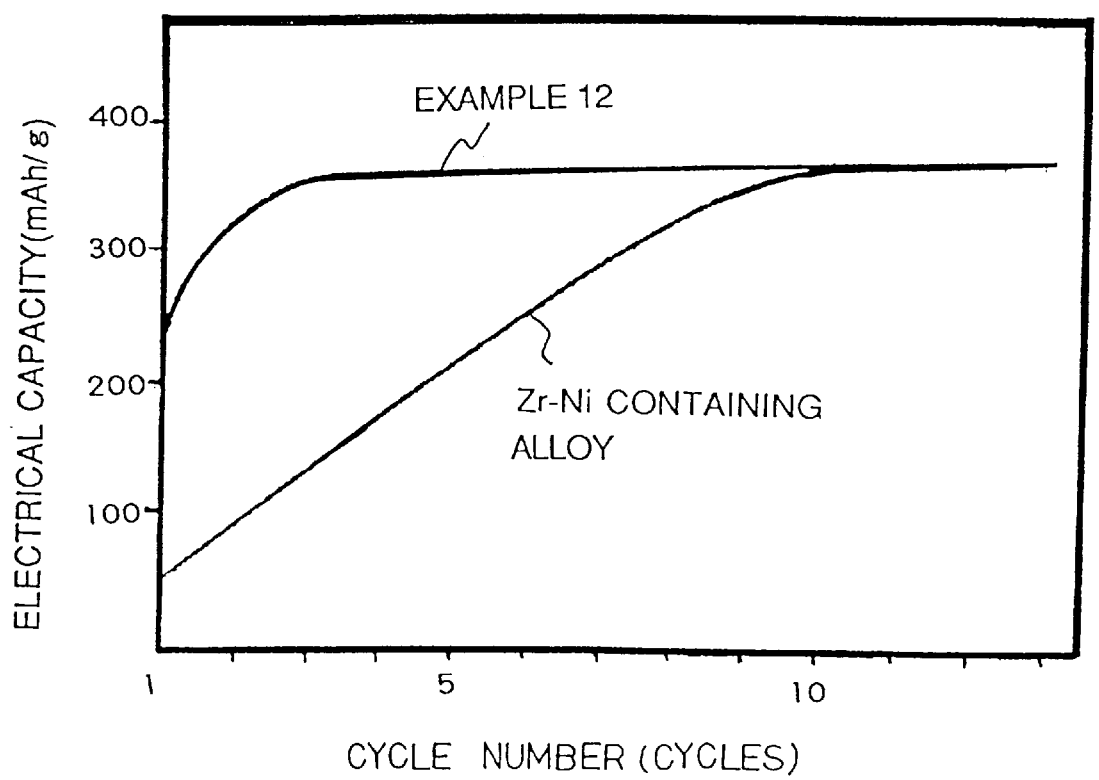
FIG. 4 is a graph comparing the results of the charging/discharging cycle properties of the alloy of Example 12 and a prior art Zr—Ni containing alloy.

Next, the battery properties test was conducted with the above-mentioned alloys. Each alloy was pulverized to powder which passes through a 200 mesh. The hydrogen absorption alloy was kneaded with 1.0 wt. % poly vinyl alcohol aqueous solution into a paste. An expanded nickel substrate is filled with the pasty substrate and dried. This is then press-molded to a predetermined thickness so as to become a hydrogen absorption electrode. The weight of the alloy powder in the electrode is 1.0 g each. The electrode obtained in this way was used as a working electrode. In order to have an open type test cell, a separator made of nylon was positioned between the electrode-and a nickel electrode (positive electrode) having nickel hydroxide as an active material, which was formed by a known method, and 30 wt. % potassium hydroxide aqueous solution was used as an alkaline electrolytic solution. The result of the battery properties test is shown in Table II and FIGS. 2–4.

The scandium containing alloy of the present invention shows a high capacity of more than 200 mAh/g from the first cycle of the charging/discharging cycle. On the other hand, the conventional Zr—Ni containing alloy shows a discharge capacity of 50 mAh/g at the first cycle of the charging/discharging cycle. The number of charging/discharging cycles needed to reach the maximum discharge capacity is three for the alloy of the present invention, which is less than that of the conventional Zr—Ni containing alloy, which requires 10. This shows that it is easy for the Sc—Ni containing alloy to be activated electrochemically.

As a result of this, a nickel-hydrogen storage battery utilizing an alloy of the present invention has a high capacity and can easily be activated electrochemically.

The hydrogen absorption alloy of the present invention can absorb more hydrogen than the conventional alloy.

The hydrogen absorption electrode of the present invention can have a much higher capacity than a conventional $AB_2$ type alloy, such as $ZrMn_2$, and can obtain a negative pole without needing to be activated.

TABLE I

THE RESULTS OF X-RAY POWDER DIFFRACTION MEASUREMENT AND P-C-T MEASUREMENT

| EXAMPLE NO. | ALLOY COMPOSITION | ALLOY PHASE | HYDROGEN ABSORPTION CONTENT Wt. % | LATTICE CONSTANT (C15) |
|---|---|---|---|---|
| 2 | $ScNi_{1.1}Co_{0.2}Mn_{0.7}$ | C15, BCC | 1.90 | a = 7.0268 |
| 3 | $Sc_{0.6}Ti_{0.2}Ni_{1.1}Co_{0.2}Mn_{0.7}$ | C15, BCC | 1.85 | a = 6.9843 |
| 4 | $Sc_{0.6}Ti_{0.4}Ni_{1.1}Co_{0.2}Mn_{0.7}$ | C15, C14, BCC | 1.65 | a = 6.9578 |
| 5 | $Sc_{0.6}Ti_{0.4}Ni_{1.1}Co_{0.2}Mn_{0.5}Cr_{0.2}$ | C15, C14, BCC | 1.60 | a = 6.9537 |
| 6 | $Sc_{0.6}Ti_{0.4}Ni_{1.1}Co_{0.2}Mn_{0.3}V_{0.2}Cr_{0.2}$ | C15, C14, BCC | 1.70 | a = 6.9600 |
| 7 | $Sc_{0.6}Zr_{0.4}Ni_{1.1}Co_{0.2}Mn_{0.7}$ | C15, BCC | 1.60 | a = 7.0198 |
| 8 | $Sc_{0.8}Zr_{0.2}Ni_{1.1}Co_{0.2}Mn_{0.7}$ | C15, BCC | 1.75 | a = 7.0212 |
| 9 | $Sc_{0.6}Zr_{0.2}Ti_{0.2}Ni_{1.1}Co_{0.2}Mn_{0.7}$ | C15, BCC | 1.63 | a = 6.9971 |
| 10 | $Sc_{0.6}Zr_{0.4}Ni_{1.1}Co_{0.2}Mn_{0.5}Cr_{0.2}$ | C15, BCC | 1.60 | a = 7.0121 |
| 11 | $Sc_{0.6}Zr_{0.4}Ni_{1.1}Co_{0.2}Mn_{0.5}V_{0.2}$ | C15, BCC | 1.70 | a = 7.0211 |
| 12 | $Sc_{0.6}Y_{0.4}Ni_{1.1}Co_{0.2}Mn_{0.5}Cr_{0.2}$ | C15, BCC | 1.50 | a = 7.0198 |
| 13 | $Sc_{0.8}Y_{0.2}Ni_{1.1}Co_{0.2}Mn_{0.5}Cr_{0.2}$ | C15, BCC | 1.75 | a = 7.0212 |
| 14 | $Sc_{0.8}Ce_{0.2}Ni_{1.1}Co_{0.2}Mn_{0.5}Cr_{0.2}$ | C15, BCC | 1.63 | a = 6.9971 |
| 15 | $Sc_{0.8}Mn_{0.2}Ni_{1.1}Co_{0.2}Mn_{0.5}Cr_{0.2}$ | C15, BCC | 1.60 | a = 7.0121 |
| 16 | $Sc_{0.8}Y_{0.2}Ni_{1.1}Co_{0.2}Mn_{0.5}V_{0.2}$ | C15, BCC | 1.65 | a = 7.0200 |

TABLE II

DISCHARGE CAPACITY

| EXAMPLE NO. | DISCHARGE CAPACITY AT THE FIRST CYCLE (mAh/g) | DISCHARGE CAPACITY AT THE THIRD CYCLE (mAh/g) | DISCHARGE CAPACITY AT THE TENTH CYCLE (mAh/g) |
|---|---|---|---|
| Zr-Ni CONTAINING ALLOY | 50 | 130 | 350 |
| 2 | 240 | 350 | 350 |
| 3 | 215 | 356 | 357 |
| 4 | 210 | 347 | 376 |
| 5 | 230 | 354 | 401 |
| 6 | 205 | 359 | 400 |
| 7 | 245 | 350 | 350 |
| 8 | 211 | 356 | 357 |
| 9 | 218 | 347 | 376 |
| 10 | 223 | 354 | 387 |
| 11 | 205 | 359 | 376 |
| 12 | 245 | 350 | 350 |
| 13 | 211 | 380 | 385 |
| 14 | 218 | 386 | 389 |
| 15 | 223 | 365 | 370 |
| 16 | 205 | 278 | 383 |

*Zr-Ni CONTAINING ALLOY WHOSE COMPOSITION IS $Zr_{0.5}\ Ti_{0.5}\ Ni_{1.1}\ Fe_{0.2}\ Mn_{0.2}\ V_{0.5}$ IS USED.

We claim:

1. A scandium containing hydrogen absorption alloy having an alloy phase which is represented by the following formula consisting of:

$$(Sc_xA_{1-x})(B'_yB''_{2-y})_z,$$

wherein:
A is one selected from the group consisting of:
(i) Ti;
(ii) Zr; and
(iii) a mixture of Ti and Zr;
B' is one selected from the group consisting of:
(i) Ni; and
(ii) a mixture of Ni and Co; and
B" is one selected from the group consisting of:
(i) Mn;
(ii) a mixture of Mn and Cr;
(iii) a mixture of Mn and V; and
(iv) a mixture of Mn, Cr, and V;
and wherein x represents $0<x\leq1$; y represents $0<y<2$; and z represents $0.75\leq z\leq1.2$, and said alloy phase includes at least one part which belongs to a C15 Laves phase and a part which belongs to a C14 Laves phase.

2. A scandium containing hydrogen absorption alloy as defined in claim 1, wherein said x represents $0.2\leq x\leq1$.

3. A hydrogen absorption electrode comprising a scandium containing hydrogen absorption alloy which is represented by the following formula consisting of:

$$(Sc_xA_{1-x})(C'_yC''_{2-y})_z,$$

wherein:
A is one selected from the group consisting of:
(i) Ti;
(ii) Zr; and
(iii) a mixture of Ti and Zr;

C' is one selected from the group consisting of:
  (i) Ni; and
  (ii) a mixture of Ni and Co; and
C" is one selected from the group consisting of:
  (i) Mn;
  (ii) a mixture of Mn and Cr;
  (iii) a mixture of Mn and V; and
  (iv) a mixture of Mn, Cr, and V;

and wherein x represents $0<x\leqq 1$; y represents $0<y<2$; and z represents $0.75\leqq z\leqq 1.2$, and said alloy phase includes at least one part which belongs to a C15 Laves phase and a part which belongs to a C14 Laves phase.

4. A hydrogen absorption electrode as defined in claim 3, wherein said x represents $0.2\leqq x\leqq 1$.

* * * * *